United States Patent [19]

Dowe

[11] Patent Number: 4,881,093
[45] Date of Patent: Nov. 14, 1989

[54] ELECTROMAGNETIC SHUTTER APPARATUS

[75] Inventor: David R. Dowe, Holley, N.Y.
[73] Assignee: Eastman Kodak Company, Rochester, N.Y.
[21] Appl. No.: 185,196
[22] Filed: Apr. 21, 1988
[51] Int. Cl.$^4$ .............................................. G03B 9/10
[52] U.S. Cl. .................................. 354/234.1; 354/261
[58] Field of Search ................... 354/230, 234.1, 250, 354/271.1, 261

[56] References Cited

U.S. PATENT DOCUMENTS

| | | | |
|---|---|---|---|
| 1,444,365 | 2/1923 | Bowes | 354/234.1 |
| 3,533,345 | 10/1970 | Starp | 95/53 |
| 3,638,550 | 2/1972 | Hereford | 95/53 E |
| 3,687,042 | 8/1972 | Mizui et al. | 95/53 EA |
| 4,012,750 | 3/1977 | Rentschler | 354/232 |
| 4,060,313 | 11/1977 | Blade et al. | 350/269 |
| 4,113,359 | 9/1978 | Koike et al. | 350/269 |
| 4,211,480 | 7/1980 | Kitai et al. | 354/234 |
| 4,227,792 | 10/1980 | Rentschler | 354/230 |
| 4,286,856 | 9/1981 | McGrath | 354/234 |
| 4,332,450 | 1/1982 | Griffith | 354/234 |
| 4,417,797 | 11/1983 | Senuma | 354/234 |
| 4,497,557 | 2/1985 | Peterson | 354/234.1 |
| 4,514,064 | 4/1985 | Kurosu et al. | 354/234.1 |
| 4,648,701 | 3/1987 | Ogihara et al. | 354/234.1 |

FOREIGN PATENT DOCUMENTS

| | | |
|---|---|---|
| 3023945 | 6/1980 | Fed. Rep. of Germany. |
| 63-36227 | 2/1988 | Japan. |
| 63-36228 | 2/1988 | Japan. |
| 63-36229 | 2/1988 | Japan. |
| 63-36230 | 2/1988 | Japan. |

*Primary Examiner*—A. A. Mathews
*Attorney, Agent, or Firm*—James A. Smith

[57] ABSTRACT

An electromagnetically operated shutter assembly for a camera includes permanent magnets which are affixed to shutter blades. An electromagnetic field is generated by a number of armatures which interact with the permanent magnets to cause the shutter blades to move between open and closed positions. The configurations of the permanent magnets and armatures permit the blades to be held in the open and closed positions without the further application of current to the armatures. The permanent magnets are "levitated" by the electromagnetic field in order to facilitate movement of the shutter blades between the opening and closing positions.

8 Claims, 3 Drawing Sheets

4,881,093

ELECTROMAGNETIC SHUTTER APPARATUS

TECHNICAL FIELD

The present invention pertains to an electromagnetic shutter assembly for an image reproducing device such as a camera.

BACKGROUND OF THE INVENTION

In a camera having a shutter mechanism which is electrically operated, it is desirable to maximize shutter speed while minimizing power requirements for moving the shutter and for holding the shutter in the open and closed positions.

Conventionally, a number of shutter mechanisms have been disclosed. For example, in U.S. Pat No. 3,687,042 by Mizui et al there is described an electromagnetically operated shutter mechanism in which a number of electromagnetic coils are affixed to an actuator frame which is caused to rotate when power is applied to the coils and thereby move a number of shutter blades.

In order to reduce the complexities of these shutter mechanisms, systems have been disclosed in which a permanent magnet is attached to the shutter blade. For example, in U.S. Pat. No. 4,060,313 by Kondo, a thin permanent magnet sheet is sealed in a plastic shutter blade which is driven to the open position by an electromagnetic coil which is fixed about the shutter blade; the blade being biased to the closed position by a spring.

In addition, in U.S. Pat. No. 4,497,557 by Petersen, there is disclosed a shutter mechanism in which permanent magnets of opposing polarities are attached to the opposite ends of each shutter blade to be driven by an electromagnetic coil.

Furthermore, Griffith in U.S. Pat. No. 4,332,450, discloses an electromagnetic actuator which includes a shutter blade having affixed thereto a permanent magnet and which is driven by an electromagnet.

On the other hand, in U.S. Pat. No. 4,514,064 by Kurosu et al, there is disclosed an electromagnetic shutter in which a number of permanent magnets are affixed to a frame, and an electromagnetic coil is attached to the shutter blade which inductively interacts with the permanent magnets to move the shutter blade.

Another electromagnetic actuator for a shutter mechanism, which includes a rotor formed by a pair of offset semicircular portions, is described in U.S. Pat. No. 3,638,550 by Hereford.

SUMMARY OF THE INVENTION

The present invention pertains to a shutter apparatus which includes support means having an opening. The invention includes blade means which are attached to the support means for movement about a main axis between a first position in which the blades means cover a greater amount of the opening, and a second position in which the blade means cover a lesser amount of the opening. Also provided are magnetic means which are attached to the blade means in a manner that the mass of the magnetic means are generally centered about the main axis. In addition, there are means, attached to the support means, for generating an electromagnetic field which interacts with the magnetic means so as to cause movement of the magnetic means in a manner that the blade means move between the first position and the second position.

In another embodiment, there are means, attached to the support means, for generating an electromagnetic field which interacts with the magnetic means so as to cause movement of the magnetic means in a manner that the blade means move between the first position and the second position. The field generating means include electromagnetic means which are positioned above the floor in a manner to support the magnetic means by means of a magnetic attraction between the electromagnetic means and the magnetic means so as to reduce frictional forces acting on the magnetic means.

BRIEF DESCRIPTION OF THE DRAWINGS

These and other embodiments and features of the present invention will become more readily apparent upon reading the following detailed description in conjunction with the attached drawings, in which.

DETAILED DESCRIPTION OF THE INVENTION

Figure 1:
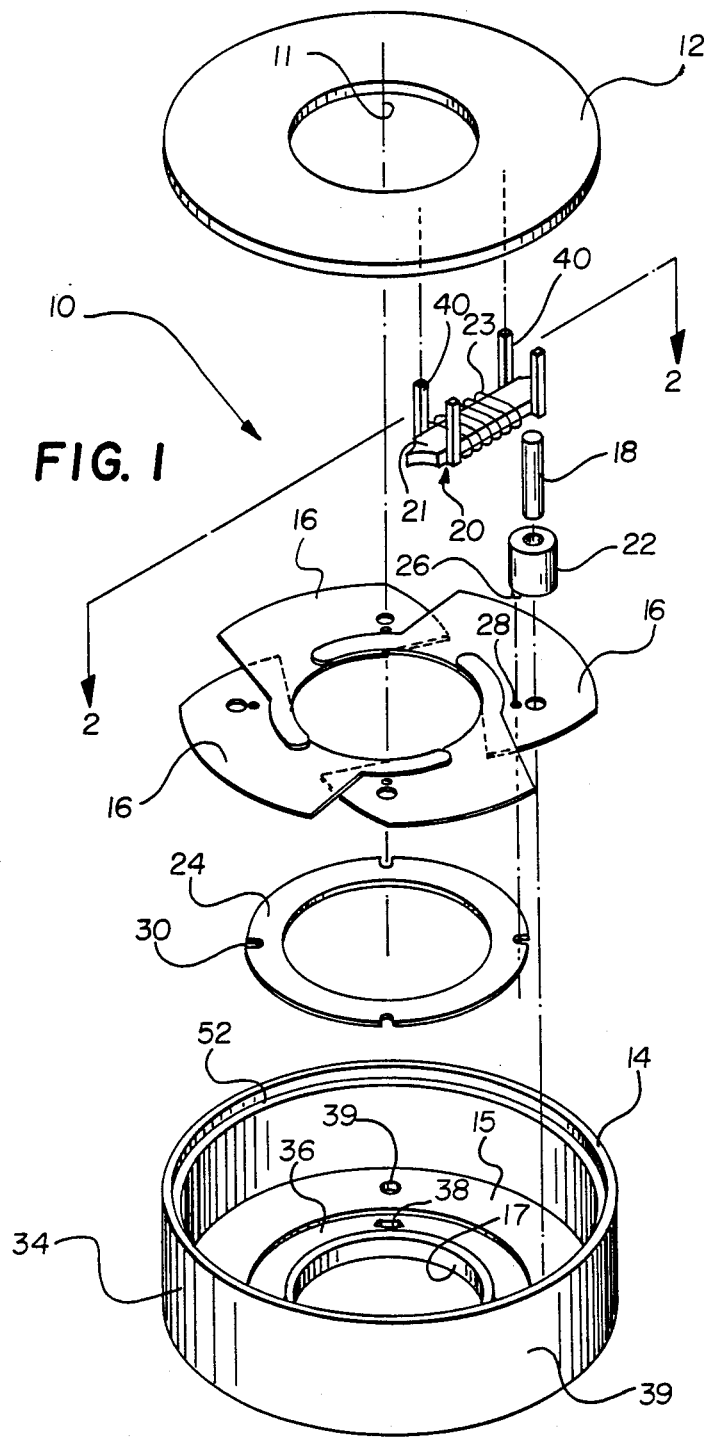
FIG. 1 is an isometric exploded view of the electromagnetic shutter assembly of the present invention in which only one armature and one magnet is shown for ease of illustration.

Before proceeding with a detailed description of the present invention, a brief overview will be provided. Referring first to FIG. 1, there is shown an electromagnetic shutter assembly generally indicated at 10 which is oriented about an optical axis indicated by a vertical line 11. The shutter assembly 10 includes an upper retaining ring 12 having a central opening aligned with the optical axis, and a lower support cup 14 which has a lower floor 15 as well as a central opening 17 therein which is also aligned with the optical axis. The floor 15 supports a number of shutter blades 16 on upwardly extending pivot pins 18, only one of which is shown for ease of illustration. Movement of the shutter blades between an open position shown in FIG. 3 and a closed position shown in FIG. 4 is accomplished by a number of armatures indicated at 20 which inductively interact with a corresponding number of cylindrical shutter blade magnets 22. In the present invention, the shutter blade magnets 22 are permanent magnets, whereas each armature 20 is formed by a ferromagnetic bar 21 which is wrapped by copper windings 23.

As shown in FIG. 1, the magnets 22 are affixed to the upper surfaces of the shutter blades 16 about the support pins 18. Upon application of an electric current to the armatures 20, an electromagnetic field is generated which causes the magnets 22 to rotate about the pins 18, which in turn opens or closes the shutter blades 16 depending upon the direction of the electrical current. In this manner, the central opening 17 of the lower support cup 14 is covered or uncovered by the shutter blades.

The shutter blades 16 are caused to move in the opening and closing directions at the same rate by means of a synchronizing ring 24 (FIG. 1) which is set on top of the lower support cup 14 below the shutter blades. The synchronizing ring 24 also has a central opening which is aligned with the optical axis. More particularly, each magnet 22 includes a downwardly extending synchronizing pin 26 which extends through a vertical hole 28 in the corresponding shutter blade 16 and which engages a corresponding notch 30 in the outer circumferential edge of the synchronizing ring 24. In this manner, when the shutter blades 16 are moved between the open and closed positions, the synchronizing ring 24 is caused by the synchronizing pins 26 to rotate in a clockwise or counterclockwise direction while maintaining equal rates of movement of the blades 16.

Having provided this brief overview, attention now will be turned to the details of the present invention. As shown in FIG. 1, the lower support cup 14 includes a cylindrical sidewall 34 which extends upwardly from the floor 15. In order to receive the synchronizing ring 24, the upper surface of the floor 15 includes a circular sunken channel 36 having a width dimension which is slightly larger than the width dimension of the synchronizing ring to permit the synchronizing ring to rotate freely within the channel 36. Inside the channel 36 are a number of arcuate shaped slots 38 for receiving the downwardly depending synchronizing pins 26 of the circular magnets. Each slot 38 is sized to permit movement of the synchronizing pin during rotation of the corresponding magnet 22.

Pivotal support for the circular magnets 22 as well as the shutter blades 16 is provided by a number of the pivot pins 18 which extend upwardly from the circular floor 15 at equidistant locations around the floor outboard of the channel 36. The pivot pins 18 are held within holes 39 in the floor 15 outboard of the channel 36. In an exemplary embodiment, four pivot pins are used to pivotally engage four circular magnets which in turn actuate four shutter blades. It should be appreciated however, that the present invention can include any number of shutter blades and magnets.

In a further exemplary embodiment, each magnet 22 has a cylindrical shape with the pivot pin 18 aligned along the central axis of the magnet. In this manner the center of mass of the magnet is centered around the pivot axis of the blade thereby reducing the rotational moment. However, other magnet shapes may be used, such as a bar magnet, as will be explained later on in this description.

Figure 4:
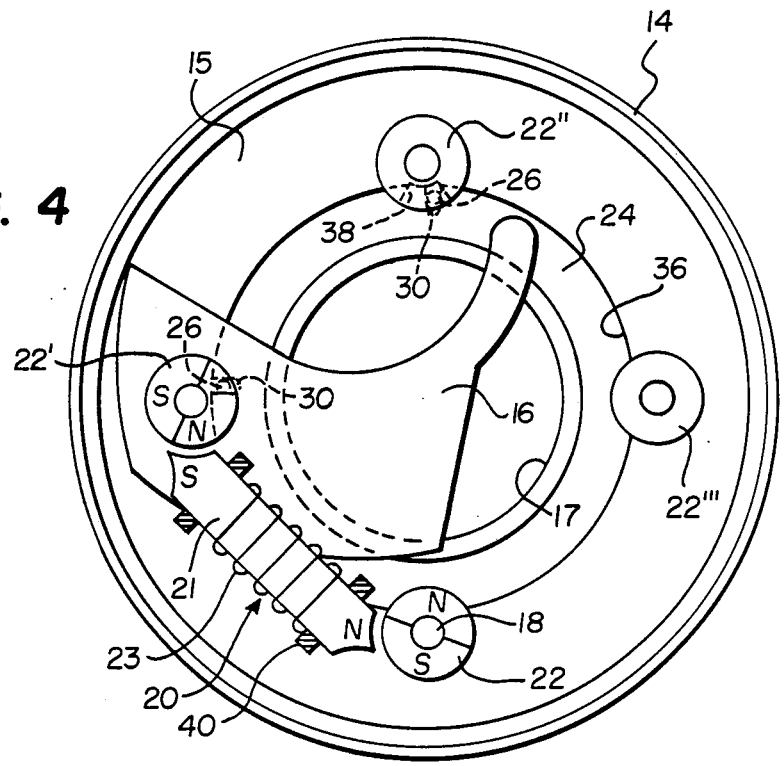
FIG. 4 is a top sectional view of the shutter assembly similar to FIG. 2, in which the shutter is in a closed position and only one shutter blade and armature are shown for ease of illustration.
Figure 5:
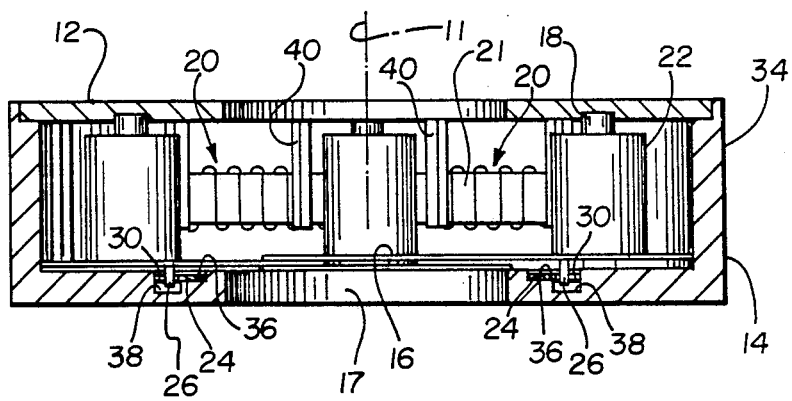
FIG. 5 is a side sectional view of the shutter assembly.
Figure 4:
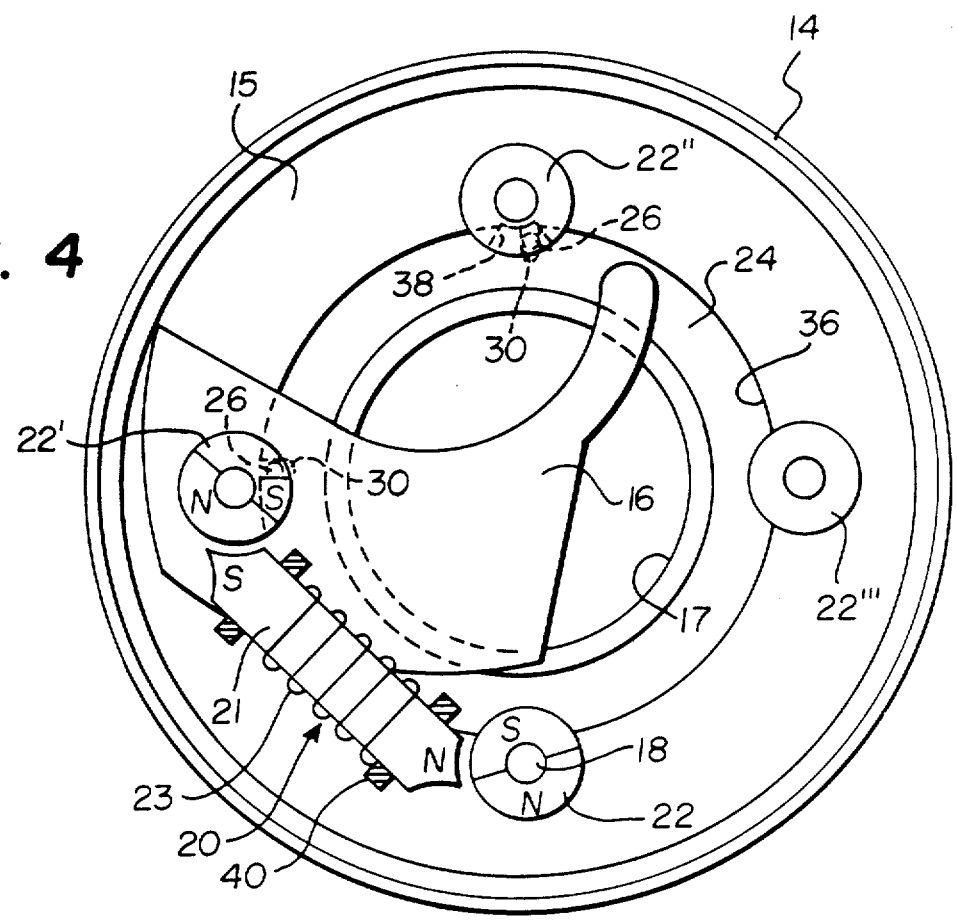
Figure 5:
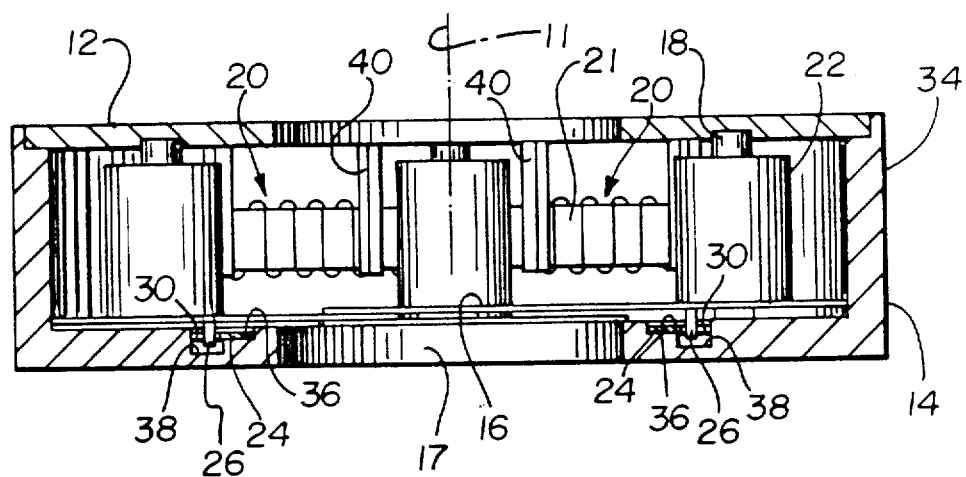

In the present invention, the magnets 22 are "levitated" on the pins 18 above the synchronizing ring 24 by the armatures 20. More specifically as shown in FIG. 5, the armatures 20 are mechanically supported midway between the floor 15 and the upper retaining ring 12 at locations adjacent to the magnets 22. As further shown in FIGS. 3 and 4, each end of the armature 20 and adjacent shutter magnet 22 have opposite polarities which generates an attractive magnetic force therebetween. This attractive force operates to support the magnet in the plane of the armatures (FIG. 5). This attractive force tends to hold the magnet 22 and blade 16 away from the floor 15 and upper retaining ring 12. This allows each magnet 22 to more freely rotate on the corresponding pin 18. This reduces the power required to operate the shutter while promoting rapid opening and closing of the shutter blades.

Figure 2:
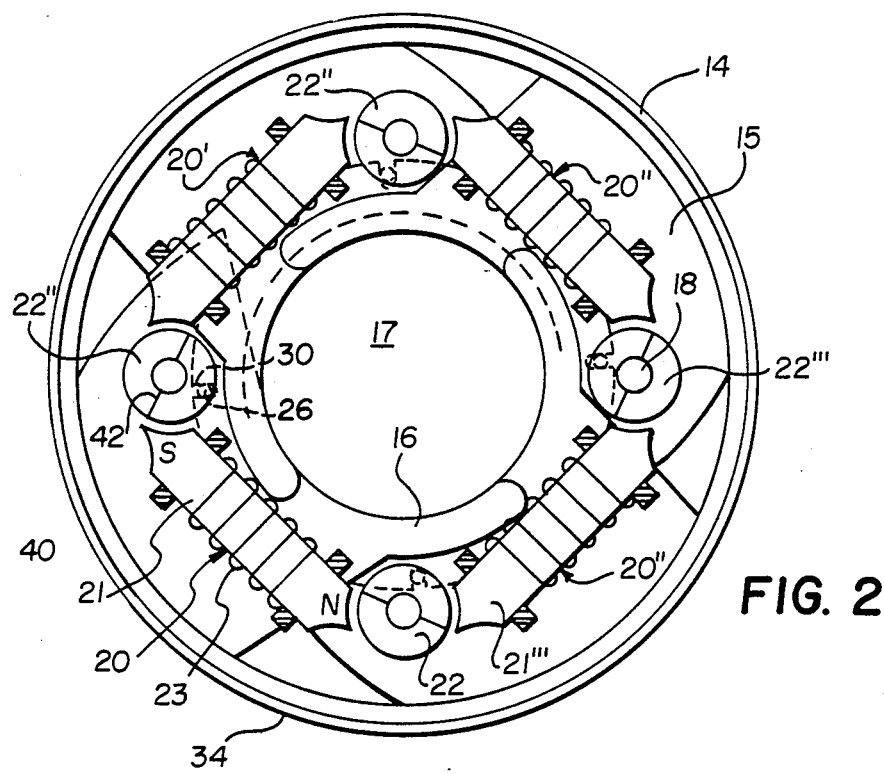
FIG. 2 is a top sectional view of the shutter assembly in an open position looking down from beneath an upper retaining ring of the assembly along line 2—2 of FIG. 1.

Support for each armature 20 is provided by a number of locating pins 40 (FIG. 1) which extend downwardly from the lower surface of the upper retaining ring 12 so that each end of the armature 20 is positioned between a pair of adjacent shutter magnets. The bar 21 of each armature 20 includes a middle rectangular portion which tapers to a point at each end. The tapered ends have concave shapes to permit the end of each bar to be positioned adjacent to a cylindrical shutter magnet and to be separated from the magnet by a small air gap as shown in FIG. 2. The middle rectangular portion of each armature is press fit between two pairs of the locating pins 40 at opposing ends of the bar.

Figure 3:
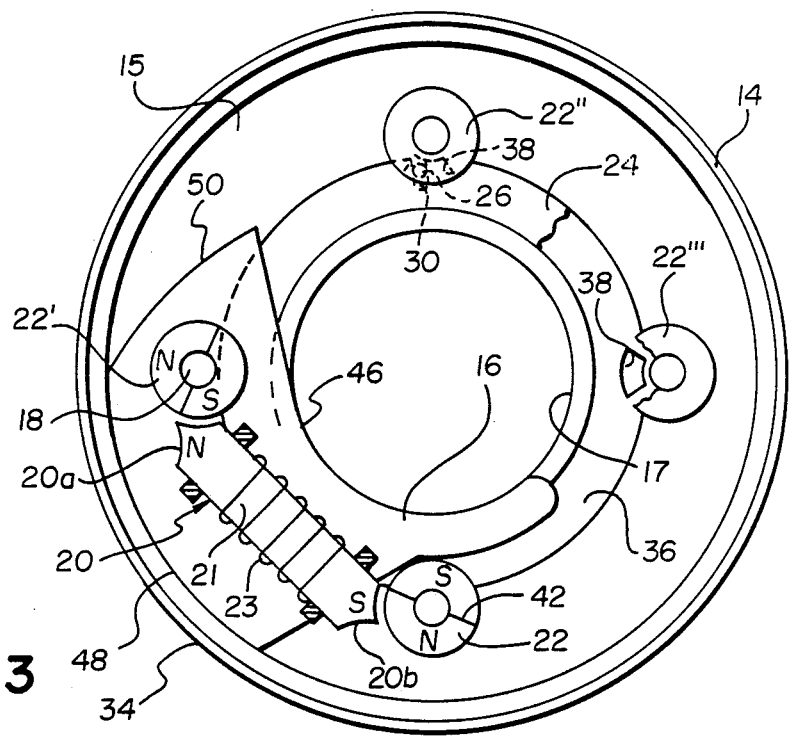
FIG. 3 is a top sectional view of the shutter assembly similar to FIG. 2, in which the shutter is in the open position and only one shutter blade and armature are shown for ease of illustration.

As shown in FIG. 3, each shutter magnet is magnetically biased to have a permanent north pole portion designated by the letter "N" and a permanent south pole portion designated by the letter "S"; the north and south poles being separated by an imaginary line designated by the number 42. Electrical current is applied from a conventional power source (not shown) through a conventional switching means (also not shown) which changes the direction of current flow through the windings 23. This current flow generates opposite magnetic polarities at opposing ends of the armature. For example as shown in FIG. 3, the current direction results in movement of the shutter to the open position. That is, the left end 20a of armature 20 has a north polarity and the right end 20b has a south polarity. The shutter magnets are affixed to the shutter blades such that when in the open position the north polarity portion of the shutter magnet 22 (located at the six o'clock position in FIG. 3) is aligned with the south polarity end 20b of the armature 20, and the north polarity end of the armature 20 is aligned with the south polarity portion of the shutter magnet 22' (nine o'clock position). In this manner, the shutter blades are held in the open position without further application of electrical current to the armatures.

On the other hand, when the direction of current through the armatures is reversed to close the shutter blades, the left end of the armature 20 is polarized south, and the right end is polarized north. This generates a magnetic repelling action between the end of the armature and the adjacent poles of the shutter magnets as well as a magnetic attracting action between the armature and the opposite poles of the shutter magnets. This causes the shutter magnets 22 to rotate about forty degrees in a clockwise direction to align with the armature in a north-south orientation as shown in FIG. 4. This moves the shutter blades to the closed position. Since this new magnetic polarity of the armature remains after termination of electrical current to the windings, no further electrical current to the armature is necessary to retain the shutter blades in the closed position.

It should be appreciated the shutter magnets need not have cylindrical configurations. Other magnet configurations such as rectangular or the like could also be used as long as the magnets were mounted so that aforementioned repelling and attracting action was achieved.

In an exemplary embodiment shown in FIG. 3, each shutter blade 16 has an inner concave surface 46, a portion of which is aligned with the inner surface of opening 17 when the shutter is in the open position. The opposing edge 48 of the blade has a convex configuration which engages the inner surface of the sidewall 34 to prevent further movement in the opening direction.

Joining the edges 46, 48 of the blade near the pivot pin 18 is a transverse convex edge 50 which engages the inner surface of the sidewall 34 when the shutter is in the closed position to prevent further movement of the shutter blade in the closing direction. In an exemplary embodiment, each blade is configured so that its center of mass is near the pivot pin 18. As shown more clearly in FIG. 1, the shutter blades are interleaved to facilitate their movement in the opening and closing directions.

The shutter blades are regulated to move at the same rate by the synchronizing ring 24 (FIG. 1). Synchronizing ring 24 includes the notches 30 which are located at equidistant locations around the outer circumferential edge of the synchronizing ring. Each notch is engaged by the corresponding synchronizing pin 26 which depends downwardly from the lower surface of the corresponding magnet 22, through a hole in the corresponding shutter blade, and into the slot 39 in the floor 19. Rotation of the shutter blades in the clockwise direction, for example, causes the synchronizing ring to rotate in the same direction within the channel 36. The engagement of the synchronizing pins inside the synchronizing notches, causes all shutter blades to move at the same rate.

In order to secure the shutter elements inside the lower support cup 14, the upper retaining ring 12 fits within a circumferential lip 52 (FIG. 1) located below the upper edge of the sidewall 34. In this manner, the lower surface of the retaining ring 12 engages the upper ends of the pivot pins 18 to insure a tight fit.

What is claimed is:

1. A shutter apparatus comprising:
   a. support means having an opening;
   b. a plurality of shutter blades which are attached to the support means for movement about a main axis between a first position in which the blades cover a greater amount of the opening, and a second position in which the blades cover a lesser amount of the opening;
   c. a plurality of permanent magnets which are respectively attached to the blades in a manner that the mass of the magnets are generally centered about the main axis;
   d. a plurality of means, attached to the support means, for generating an electromagnetic field which interacts with the permanent magnets so as to cause movement of the magnets in a manner that the blades move between their first positions and their second positions; and
   e. means for synchronizing the shutter blades and the means for generating an electromagnetic field in a manner to maintain equal rates of movement of the blades.

2. The shutter apparatus as set forth in claim 1 wherein:
   a. the plurality of shutter blades are engaged for pivotal movement between the first position and the second position by pivot means which are aligned with the main axis; and
   b. the plurality of permanent magnets are attached to the shutter blades in alignment with the main axis.

3. The shutter apparatus as set forth in claim 2 wherein the plurality of permanent magnets have a cylindrical configuration with a central axis which is aligned with the main axis.

4. A shutter apparatus comprising:
   a. support means having a first member, the first member having an opening;
   b. a plurality of shutter blades which are attached to the support means for movement about a main axis between a first position in which the blades cover a greater amount of the opening, and a second position in which the blades cover a lesser amount of the opening;
   c. a plurality of permanent magnets which are respectively attached to the blades;
   d. means, attached to the support means, for generating an electromagnetic field which interacts with the permanent magnets so as to cause movement of the magnets in a manner that the blades move between their first positions and their second positions, and the field generating means further includes a plurality of electromagnetic means which are positioned away from the first member in a manner to urge the magnets away from the first member by means of a magnetic attraction between the electromagnetic means and the magnets; and
   e. means for synchronizing the shutter blades and the means for generating an electromagnetic field in a manner to maintain equal rates of movement of the blades.

5. The apparatus as set forth in claim 4 wherein the plurality of permanent magnets is supported by the support means at a location which is generally adjacent to the electromagnetic means to promote the magnetic attraction therebetween.

6. The apparatus as set forth in claim 5 wherein:
   a. the support means includes a second member; and
   b. the plurality of permanent magnets and the electromagnetic means are supported by the support means adjacent to each other at a location between the first member and the second member in a manner that a magnetic force acts on the plurality of permanent magnets to urge the plurality of permanent magnets away from the first member and the second member.

7. A shutter apparatus comprising:
   a. support means having an opening;
   b. a plurality of shutter blades which are attached to the support means for movement between a first position and a second position in which the blades cover different amounts of the opening;
   c. a plurality of permanent magnets which are respectively attached to the blades and which have a first portion having a first magnetic pole, and a second portion having a second magnetic pole which is opposite to the first magnetic pole;
   d. means, attached to the support means, for generating an electromagnetic field so as to cause movement of the magnetic means in a manner that the blades move between their first positions and their second positions, the field generating means further including i) a plurality of electromagnetic means which are located so as to magnetically interact with the magnets and which have a first portion and a second portion, ii) means for inducing a first magnetic polarity in the electromagnetic means such that the first position has the first magnetic pole and in a manner that when the second portion of the magnetic means is closer that the first portion of the magnets to the first portion of the electromagnetic means and the second portion of the magnets have opposite magnetic polarities in order to urge the magnets to the first position, and iii) means for inducing a second magnetic polarity in the electromagnetic means such that the first portion of the electromagnetic means has the second magnetic pole in a manner that when the first portion of the magnets is closer that the second portion of the magnets to the first portion of the electromagnetic means then the first portion of the electromagnetic means and the first portion of the magnets have opposite magnetic polarities in order to urge the magnets to the second position; and e. means for synchronizing the shutter blades and the means for generating an electromagnetic field in a manner to maintain equal rates of movement of the blades.

8. The shutter apparatus as set forth in claim 7 wherein:
 a. the plurality of permanent magnets and the plurality of shutter blades pivot about a pivot axis during movement between their first positions and their second positions;
 b. the plurality of electromagnetic means is fixed at a position next to the plurality of permanent magnets; and
 c. the plurality of permanent magnets is caused to move about the pivot axis by the electromagnetic field when the plurality of electromagnetic means changes between the first magnetic polarity and the second magnetic polarity.

* * * * *

UNITED STATES PATENT AND TRADEMARK OFFICE
CERTIFICATE OF CORRECTION

PATENT NO. : 4,881,093

DATED : November 14, 1989

INVENTOR(S) : D. R. Dowe

Page 1 of 2

It is certified that error appears in the above-identified patent and that said Letters Patent is hereby corrected as shown below:

Col. 4, Line 50, before "clockwise" add --counter--'

FIGS. 4 and 5, replace original FIGS. 4 and 5 with new FIGS. 4 and 5.

Signed and Sealed this

Twelfth Day of March, 1991

Attest:

HARRY F. MANBECK, JR.

*Attesting Officer*      Commissioner of Patents and Trademarks

Pat. No. 4,881,093